(12) United States Patent
Ganser et al.

(10) Patent No.: US 7,091,990 B2
(45) Date of Patent: Aug. 15, 2006

(54) METHOD OF GUIDED BLIND DECONVOLUTION OF MICROSCOPIC IMAGES AND SOFTWARE

(75) Inventors: Michael Ganser, Giessen (DE); Joachim Wesner, Lahnau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 46 days.

(21) Appl. No.: 10/496,344

(22) PCT Filed: Nov. 28, 2002

(86) PCT No.: PCT/EP02/13406

§ 371 (c)(1),
(2), (4) Date: Nov. 9, 2004

(87) PCT Pub. No.: WO03/046753

PCT Pub. Date: Jun. 5, 2003

(65) Prior Publication Data

US 2005/0062759 A1    Mar. 24, 2005

(30) Foreign Application Priority Data

Nov. 28, 2001  (DE) .................. 101 58 163
Oct. 30, 2002  (DE) .................. 102 50 775

(51) Int. Cl.
*G06T 15/00* (2006.01)
(52) U.S. Cl. .............. 345/619; 345/427; 382/255; 382/302
(58) Field of Classification Search ............. 345/427, 345/619; 382/255, 302
See application file for complete search history.

(56) References Cited

OTHER PUBLICATIONS

Fuchs et al., Optimal Surface Reconstruction from Planar Contours, Oct. 1977, ACM, pp. 693-702.*
Conchello, et al., "Parametic blind deconvolution of fluorescence microscopy images: Preliminary results", SPIE 2655-24, pp. 1-11, Apr. 1996.
Gibson, et al., "Experimental test of an analytical model of aberration in an oil-immersion objective lens used in three-dimensional light microscopy", vol. 8, No. 10, Oct. 1991, J. Opt. Soc. Am. A., pp. 1601-1613.
Markham, et al., "Parametric blind deconvolution: a robust method for the simultaneous estimation of image and blur", vol. 16, No. 10, Oct. 1999, J. Opt. Soc. Am. A, pp. 2377-2391.
Monvel, et al., "Image Restoration for Confocal Microscopy: Improving the Limits of Deconvolution, with Application to the Visualization of the Mammalian Hearing Organ", Biophysical Journal, vol. 80, May 2001, pp. 2455-2470.
Booth, et al., "Aberration correction for confocal imaging in refractive-index-mismatched media", Journal of Microscopy, vol. 192, Pt. 2, Nov. 1998, pp. 90-98.
Sheppard, et al., "Effects of specimen refractive index on confocal imaging", Journal of Microscopy, vol. 185, Pt. 3, Mar. 1997, pp. 366-374.
Kundur, et al., "Blind Image Deconvolution: An Algorithmic Approach to Practical Image Restoration", pp. 1-42, May 1996 issue of IEEE Signal Processing Magazine.
Thiebaut, et al., "Strict a priori constraints for maximum likelihood blind deconvolution", pp. 1-10, Sep. 10, 1996.
Markham, et al., "Parametric blind deconvolution of microscopic images: Further results", SPIE 3261-17, pp. 1-12.

* cited by examiner

*Primary Examiner*—Phu K. Nguyen
(74) *Attorney, Agent, or Firm*—Houston Eliseeva LLP (57) ABSTRACT

A method for blind deconvolution of microscopic images in which only a single parameter is varied for the estimation of the PSF. The single parameter takes account of the optical properties of the environment of the object (40) between the objective (20) of the microscope (1) and the region above the object. The single parameter represents a functional relationship among the parameters of the individual layers.

12 Claims, 8 Drawing Sheets

Intensity

Z-Axis

Fig. 5

Intensity

Z-Axis

Z-Axis

Fig. 10

Z-Axis

METHOD OF GUIDED BLIND DECONVOLUTION OF MICROSCOPIC IMAGES AND SOFTWARE

The invention relates to methods for guided blind deconvolution of microscopic images.

The invention further relates to software on a data storage medium that causes a computer to execute a method for blind deconvolution of microscopic images.

An image of an object depends on the object itself and the apparatus function of the imaging system. The apparatus function in the space domain is called the point spread function, also abbreviated PSF. The Fourier transform of the PSF in the spatial frequency domain is also called the optical transfer function, abbreviated OTF. The abbreviations PSF and OTF will be used exclusively in the description that follows.

In rigorous terms, the PSF for a stationary imaging system is a function of six coordinates if the object and the image space are each regarded as three-dimensional (with coordinates x, y and z).

In general, however, it is assumed that the PSF depends only on relative coordinates (i.e., relative to points and planes of best focus) and thus behaves in the same way for all points within the object or within the image field; in this way it becomes possible to work more efficiently with the OTF in solving the problem numerically.

In the case considered here, that of high-resolution microscopy of three-dimensional objects, the object depth of focus (relative to an image plane) of the imaging objective is very small, so that complete determination of the three-dimensional structure requires that object and objective be moved relative to one another in the z direction and a corresponding number of images (a "stack" of images) of many horizontal "slices" must be acquired.

Given a complete stack of images, however, a variety of mathematical methods make it possible to determine the "crosstalk" between the individual layers and ultimately "subtract" the crosstalk from the data, and thus to restore the theoretically possible resolution in x and y and also improve substantially the resolution in z. These methods are generally referred to as deconvolution.

Aside from some very simple and not particularly powerful methods, however, an exact knowledge of the PSF, which describes the degree of crosstalk and smearing in each case, is necessary for this purpose. Unfortunately, the PSF in practice depends sensitively on several experimental parameters, which often are incompletely known. These are in particular the optical properties of the immersion media, such as their temperature- and concentration-dependent refractive index n and their optical thickness d, as a result of which a perturbing dependence on the focusing depth in the preparation can arise (see on this point M. J. Booth, M. A. A. Neil and T. Wilson, "Aberration Correction for Confocal Imaging in Refractive-Index-Mismatched Media," *Journal of Microscopy* 192 (2), 90–98 (1998), and C. J. R. Sheppard and P. Török, "Effects of the Specimen Refractive Index on Confocal Imaging," *Journal of Microscopy* 185 (3), 366–74 (1997)).

A variety of methods are employed in the existing art to determine a PSF for deconvolution. For example, theoretical PSFs can be calculated; that is, the PSF is calculated from a (possibly greatly simplified) model of the objective or the microscope as a whole. The problem with using a theoretical PSF is commonly that the underlying model is too simple, that is, it does not take into account all parameters of the objective and/or the object embedding or respectively the environment around the object. In practice it turns out that the objective itself can be described reasonably well and simply (modern objectives are ideal to this extent) but it is comparatively difficult to define the parameters of the object embedding or respectively the environment around the object sufficiently well or hold them sufficiently constant. Problem cases are thick specimens, living cells in solutions of partly unknown identity, etc.

Another possibility in the existing art is to derive the PSFs from the image stack of a microscopically small particle ("bead") idealized as a point in the real (representative to the greatest extent possible) embedding and environment. The measurement of a PSF, despite the effort associated with it, provides only an incomplete solution to the problem mentioned. Here a compromise must be found between diverse and mutually contradictory requirements: The most accurate possible determination of the true PSF (without systematic errors) requires beads of vanishingly small size, but these also lead to a vanishingly small measurement signal and, what is more, are difficult to handle. It must be made certain that no second bead or other foreign body is located in the domain of the PSF, which has extent in x, y and z. If a PSF so measured is used for deconvoluting a plurality of image stacks, it must be taken into account that errors in the PSF due to noise or also vibrations during its measurement manifest themselves systematically in all image stacks. The same holds for the uncertainty as to whether the conditions during the acquisition of the PSF correspond closely enough to the conditions for the individual image stacks.

A further possibility is to utilize the redundancy of an image stack in order to reconstruct simultaneously both the unknown PSF and the object (blind deconvolution). If an unambiguous result is to be obtained, however, a variety of a priori information and constraints or respectively conditions must be postulated to hold for the object and the PSF. These include, for example, that the object intensity values cannot be negative and that the PSF must be band-limited in correspondence with the numerical aperture of the optics, but also (simplifying) assumptions that the PSF and, if applicable, also the object are both finite in extent and have a certain symmetry (see on this point D. Kundur and D. Hatzinakos, "Blind Image Deconvolution: An Algorithmic Approach to Practical Image Restoration," *IEEE Signal Processing Magazine,* 43–64 (1996), and E. Thiébaut and J. M. Conan, "Strict A Priori Constraints for Maximum-Likelihood Blind Deconvolution," *J. Opt. Soc. Am. A* 12 (3), 485–92 (1995)). On suitable image material, commercial computer programs (e.g., Autodeblur from Autoquant, U.S.A.) sometimes yield good results. Wide acceptance of this approach in particular has been hindered by the fact that the algorithm is not understandable to persons not skilled in the art, the high level of computational effort (time consumed), and the possibility of artifacts. The algorithm employed is also essentially blind in the optical sense; that is, in principle it can be applied to any problem where a positive signal is convoluted with a further positive and band-limited response function, but it makes no additional assumptions as to the geometrical-optical peculiarities of the imaging system and thus has no specific "knowledge" of microscopic imaging.

A special form of blind deconvolution is parametrically guided blind deconvolution (see on this point J. A. Conchello and Q. Yu., "Parametric Blind Deconvolution of Fluorescence Microscope Images: Preliminary Results," in C. J. Cogswell, G. S. Kino and T. Wilson (eds.), Three-Dimensional Microscopy: Image Acquisition and Processing, Proceedings of the SPIE 2655, 164–74 (1996), and J. Markham and J. A. Conchello, "Parametric Blind Deconvolution of Microscopic Images: Further Results," in C. J. Cogswell, J. A. Conchello, J. M. Lerner, T. Lu and T. Wilson (chairs/eds.), Three-Dimensional and Multidimensional Microscopy: Image Acquisition and Processing, Proc. SPIE, 3261, 38–49 (1998)). This kind of deconvolution can be regarded as a combination of completely parametric deconvolution and pure blind deconvolution. Associated with it is a physical model of the PSF (see on this point S. F. Gibson and F. Lanni, "Experimental Test of an Analytical Model of Aberration in an Oil-Immersion Objective Lens Used in Three-Dimensional Light Microscopy," J. Opt. Soc. Am. A 8 (10), 1601–13 (1991)). This problem is essentially addressed by parametrizing the PSF because doing so makes it possible to take account of the a priori information and constraints in a simple fashion (automatically, so to speak). Thus for example some 14 parameters in all are used to characterize a theoretical PSF, seven of these being experimental parameters that are supposed to describe the environmental conditions for an object. What is more, a parametrization in terms of aperture errors of various orders can also be employed. Here, however, there is a restriction either to low-order terms, so that the PSF can only be inaccurately reconstructed, especially at large apertures, or many independent terms up to high order, although the coupling between these terms in practice is not identified.

It is an object of the invention to create a method for guided blind deconvolution of microscopic images that optimally takes account of the environment of an object and supplies a result in a short time.

This object is achieved with a method that is characterized by the steps of claim 1.

It is a further object of the invention[1] software for the guided blind deconvolution of microscopic images that optimally takes account of the environment of an object, supplies a result in a short time, and is quickly applicable with a variety of microscope systems.

This object is achieved with software comprising the features of claim 11.

The method and the software according to the invention have the advantage that deconvolution is fast and free of artifacts. The data forte objective or respectively the objective and optical elements located in the ray path are sufficiently well known. So tat these parameters are constant for the detennination of the PSF to be allowed. Consequently, the optically possible PSFs are restricted to a small, one-dimensional subspace. A distinct reduction in both computing time and artifacts can be expected by virtue of this way of proceeding. Only a single parameter, taking care of the environment between object and objective, is varied in determining the PSF. Here the parameter takes in the refractive indices of the media present in the environment, and a temperature variation can further be incorporated.

The subject of the invention is depicted schematically in the Drawings and is described in what follows with reference to the Figures, in which.

What must be taken into account above all for blind deconvolution is the wavefront error due to parallel layers varying in refractive index n. Suppose given a system of N parallel layers, normal to optical axis 21 of a microscope objective 20 (see FIG. 12), varying in refractive index $n_i$ and thickness $d_i$; the layers are made up for example of distinct immersion media and cover glasses. Layers that are non-parallel or non-normal, giving rise to coma, are not considered here because the aberrations expected in practice as a result are perturbing but are still orders of magnitude smaller than the aberrations due to the index mismatch cited.

An ideal optical system (objective+tube lens, etc.), achieving (approximately) ideal imaging in the design case, that is, for a well-defined combination of n values and d values, is further assumed as starting point. We now consider the case where one of the given layers (or only a portion thereof) of thickness d with design index $n_1$ is replaced by a layer with index $n_2$. All conceivable cases of parallel layers with arbitrary properties can then be assembled from a sum of such changes. Thus a pure change of thickness, for example of the cover glass, would correspond to the replacement of a portion of the immersion medium having index $n_i$ by a layer having the index $n_d$ of the cover glass.

The following simple but exact formula is found in the literature (e.g., Torok et al.) for the wavefront change w brought about in this way:

$$w = d(\cos(\alpha_2) n_2 - \cos(\alpha_1) n_1) \qquad \text{Equation 1}$$

where w and d are in units of the (vacuum) λ, $n_1$ and $n_2$ are the two refractive indices, and $\alpha_1$ and $\alpha_2$ are the angles of a ray relative to optical axis 21 in the two media. These angles can also be easily specified on the assumption that the geometric aperture GA $$GA = \sin(\alpha) = \frac{NA}{n} \qquad \text{Equation 2}$$

for a ray is constant, an assumption relevant in practice because this quantity does not vary on passage through the parallel layers.

Then $$\sin(\alpha_1) = GA \times \sin(\alpha_2) = GA \times \frac{n_1}{n_2} = \sin(\alpha_1) \times \frac{n_2}{n_1} \quad \text{Equation 3}$$

and $$\cos(\alpha_i) = \sqrt{(1 - \sin^2(\alpha_i))} \quad \text{Equation 4}$$

It should be noted that the above formulas contain a linear dependence on d; thus the resultant aberration always displays the same (relative) shape or the same zonal behavior regardless of the absolute thickness in question, or in other words it is made up of a well-defined combination of low- and higher-order spherical errors for a given aperture. There is, however, a different shape for every combination of $n_1$ and $n_2$.

As a rule, however, it is not relevant that the phase shift due to the varying optical thickness is constant, so that the wavefront deformation can better be defined such that it is zero for vanishingly small apertures, that is, $$w = d \times ((\cos(\alpha_2) - 1) \times n_2 - (\cos(\alpha_1) \times n_1) \quad \text{Equation 5}$$

Figure 1:
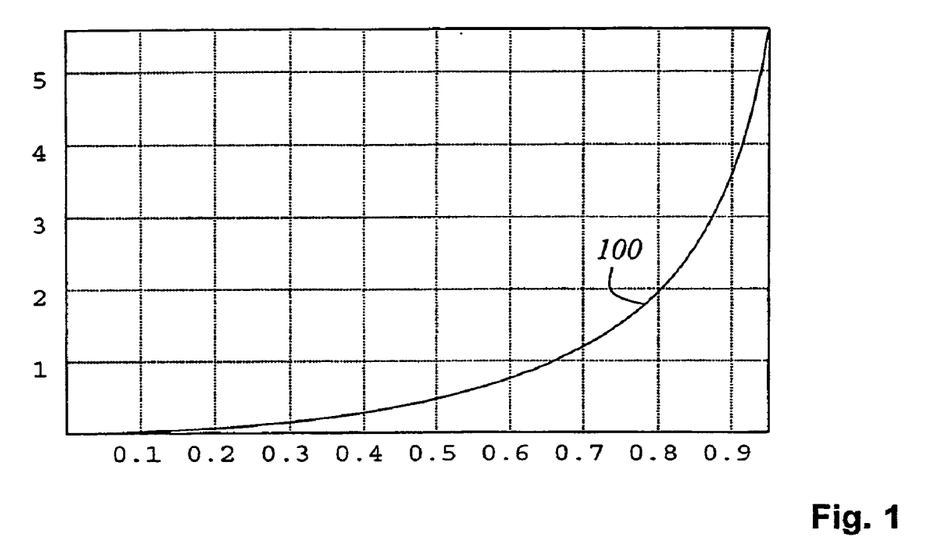
FIG. 1 shows the "true" wavefront error for a 50λ cover glass thickness error with the 63×/1.30 Glyc Corr. objective.

For the example of the practically relevant case of a DIN cover glass in a glycerin immersion ($n_1$=1.460, $n_2$=1.524), the wavefront error w in λ for a cover glass thickness d (or respectively a thickness error Δd!) of 50λ, roughly corresponding to the maximum adjustment range of ±30 μm for the 63×/1.30 Glyc Corr objective, is found to behave in the following way:

FIG. 1 shows the "true" wavefront error for a 50λ cover glass thickness error with the 63×/1.30 Glyc Corr objective. This plot 100, however, tells only half the story. Along with a constant phase error, the above aberration also contains a defocus term; that is, the position of the sharpest image changes when the additional or respectively changed layer is introduced. Classically, the focus position is often defined in terms of the so-called paraxial focus, the position at which all quadratic aberration terms are zero for vanishingly small apertures. The impact of a defocus proper is then approximated only as a quadratic variation of the wavefront. The following approximation is then obtained for the above case:

$$w = d \times (\cos(\alpha_2) - 1) \times n_2 - (\cos(\alpha_1) - 1) \times n_1) - d(n_2 - n_1) \times \sin^2 \frac{\alpha_1}{2}$$

Hence, however, it is also relatively easy to state a better correction that properly takes account of the higher orders of the defocus. (See below for more on this point.)

$$w = d \times (\cos(\alpha_2) - 1) \times n_2 - (\cos(\alpha_1) - 1) \times n_1) - d(n_2 - n_1) \times (1 - \cos(\alpha_1))$$

Figure 2:
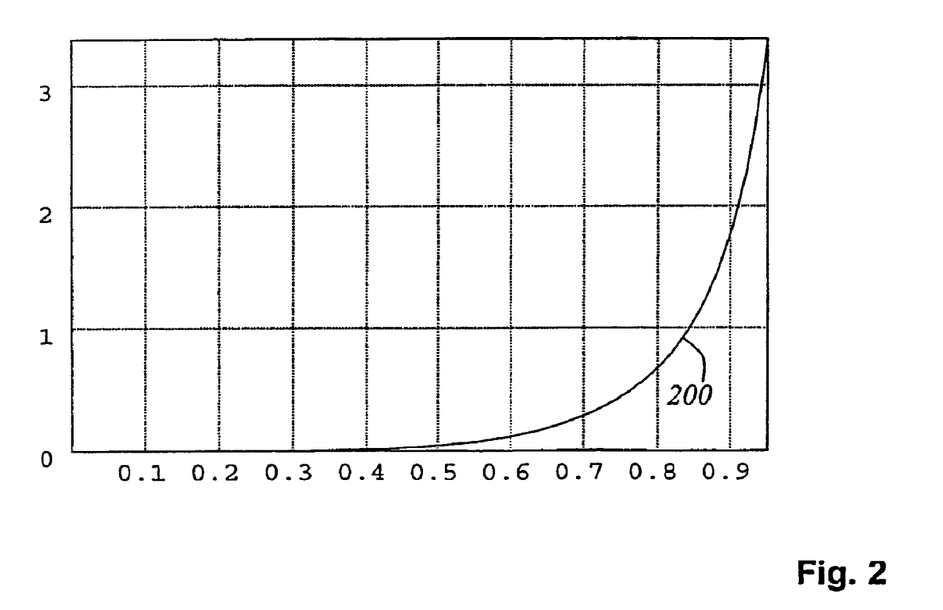
FIG. 2 shows the aberration plot for a wavefront error for a 50λ cover glass thickness error with the 63×/1.30 Glyc.

With this, aberration behavior 200 depicted in FIG. 2 is now found for the above example of a wavefront error for a 50λ cover glass thickness error with the 63×/1.30 Glyc, paraxial focus. This diagram clearly shows that index mismatch correction comes into play only for a GA of about 0.4 or larger and that aberrations of high order are dominant.

At high apertures, minimizing the quadratic and higher terms about the pupil center is no longer meaningful. Best imaging is achieved only when the residual defocus term is averaged as much as possible over the whole pupil. This, however, also leads to the situation that the resulting aberration at best focus does not have values of just one sign but oscillates about zero. See below as well.

There exists a universal formula for vanishingly small index differences Δn. For small (rigorously speaking, infinitesimally small) index differences Δn, it is possible to find an approximation for the wavefront error that is not only proportional to the thickness d but is also proportional to the index difference Δn. In the limit and again after removing the constant phase, one finds $$w = (d \times \Delta n) \times \left( \cos(\alpha_1) - 1 + \frac{\sin^2(\alpha_1)}{\cos(\alpha_1)} \right)$$

This approximation now depends only on the product of the thickness and the index error (and indirectly on the refractive index $n_1$) and no longer depends on other parameters. In what follows, this product will be referred to as the Corr value Cr:

$$Cr = d \times \Delta n$$

or, according to the case, $$Cr = \Delta d \times \Delta n$$

Thus the case in question, that of variable cover glass correction in glycerin, corresponds to a Corr value of roughly $$Cr = 50 \times (1.524 - 1.460) = 3.2(\lambda)$$

Now it becomes clear that both errors in the cover glass thickness and also in the temperature or concentration of the immersion medium, say, can be (approximately) described and corrected with just one parameter.

An important point that applies only to the approximation mentioned is that arbitrary, complex sequences of layers can be described with this approximation by a single equivalent layer or respectively an aberration that simply corresponds to the sum of the individual Corr values: $Cr_{tot} = \Sigma Cr_i$.

Figure 3:
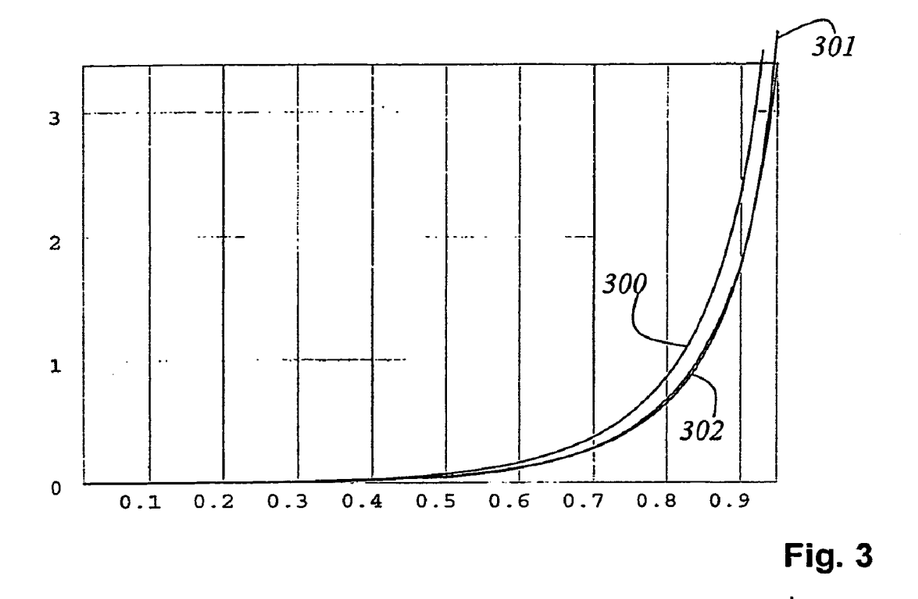
FIG. 3 presents a comparison of a calculated example for APO 63×/1.30 Glyc Corr, between the universal formula and the exact formula including defocus.

FIG. 3 presents a comparison of a calculated example for APO 63×/1.30 Glyc Corr, between the universal formula and the exact formula including defocus. With the formulas above, it is now possible to investigate the quality of the universal approximation in the practical example cited. If one compares the exact result (curve 300) with the approximation for Cr=3.2 (curve 301), the agreement is not remarkably good at first glance; even if the offset of the focus positions has already been compensated, deviations of up to roughly λ/2 are seen at the edge of the pupil. The wavefront approximation curve for Cr=3.2 (curve 301) and the wavefront approximation curve for Cr=2.4 (curve 302) nearly coincide.

The above approximation does not yet represent the best that can be attained, however. It must still be recognized that the aberrations predicted by the approximation are always too high in the case described. In practice—both with manual adjustment of the Corr ring on the objective for best imaging and also with the planned guided blind deconvolution—the exact optical parameters of the specimen embedding are also unknown, so that the optimal Cr value can be found only by trial and error. The numerical Cr value is of no interest at all. Indeed, a somewhat smaller value of Cr=2.4, other characteristics of the model remaining unchanged, still yields nearly perfect agreement with the exact solution.

Figure 4:
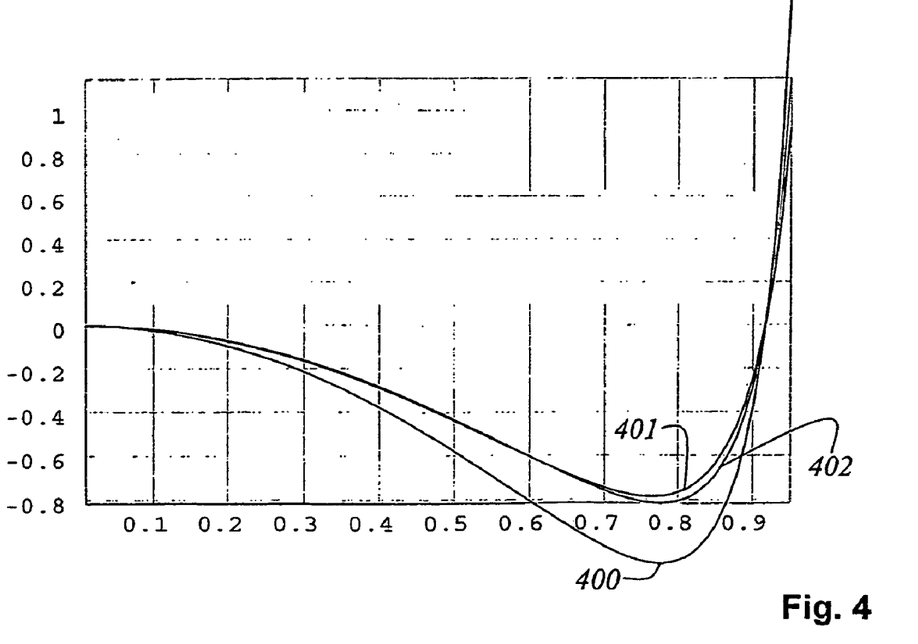
FIG. 4 presents a comparison of the residual aberrations at best focus.

FIG. 4 presents a comparison of the residual aberrations at best focus. Here the deviations can be somewhat better recognized. As was done previously, the wavefront errors were calculated for the 63×/1.30 Glyc at best focus; the result is plotted as curve 401. The wavefront approximation for Cr=3.2 is depicted by curve 302, and that for Cr=2.4 by curve 403. The two curves nearly coincide. While direct application of the approximation with Cr=3.2 leads to (already averaged) wavefront errors >0.2λ, the residual error can be reduced to less than 1/20 of this value with the optimal Corr value and is thus irrelevant in practice. The Strehl value at the paraxial focus improves from a maximum of 74% for a strongly asymmetrical z-response to a virtually perfect 99.6% for a largely symmetrical response.

In conclusion it should be said once again that this approximation can also be applied to practically any layer system without the need to vary more than one parameter. The one parameter to be varied is a functional representation of the individual parameters of the layers in a system of layers. If each of the partial layers can be sufficiently well approximated by a suitable value of Cr, the entire system can also be sufficiently well approximated by a Cr equal to the sum of the Cr values, because the individual approximations are merely variously scaled images of the above universal function.

Thus the PSFs under consideration here (FIG. 5 to FIG. 11) are functions of (x, y, z). With regard to the goal of the invention, the PSF is assumed symmetrical in (x, y) and the z dependence, that is, the variation in the direction of the optical axis defined by the microscope system, is subjected to special scrutiny.

Figure 5:
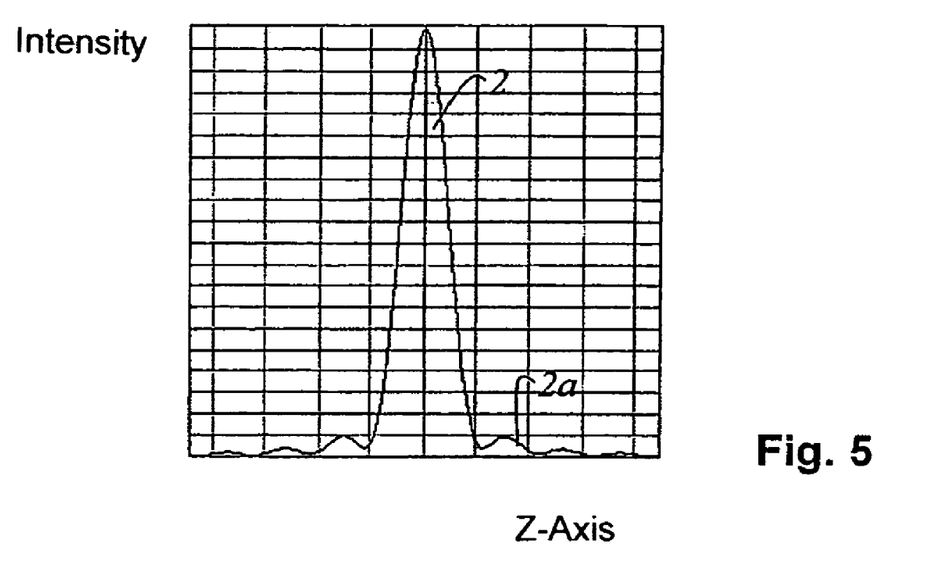
FIG. 5 depicts an ideal PSF.

FIG. 5 depicts an "ideal" PSF by way of example. The intensity I is plotted versus displacement in the z direction (along the optical axis) of the microscope system. At the focus a high intensity is obtained; this manifests itself as distinct, symmetrical peak 2 in the PSF. Away from the focus (in both directions), small secondary maxima 2a occur, ultimately disappearing in the noise.

Figure 6:
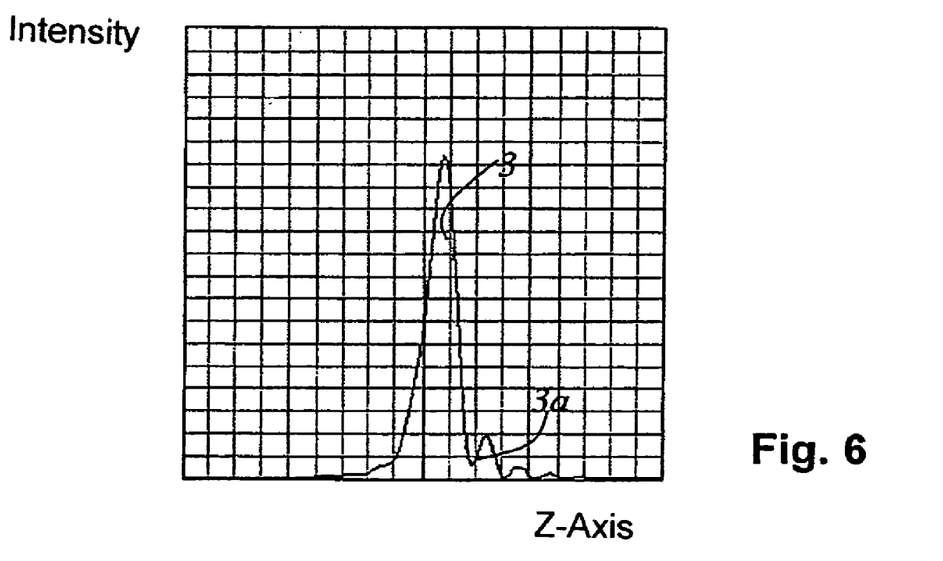
FIG. 6 depicts a PSF affected by a small deviation of the refractive index of the medium surrounding the object.

Now FIG. 6 depicts a PSF produced by a small deviation of the refractive index of the medium surrounding the object. It can be clearly seen that this perturbation causes peak 3 of the perturbed PSF to display a marked asymmetry. Secondary peaks 3a likewise become more distinct.

Figure 7:
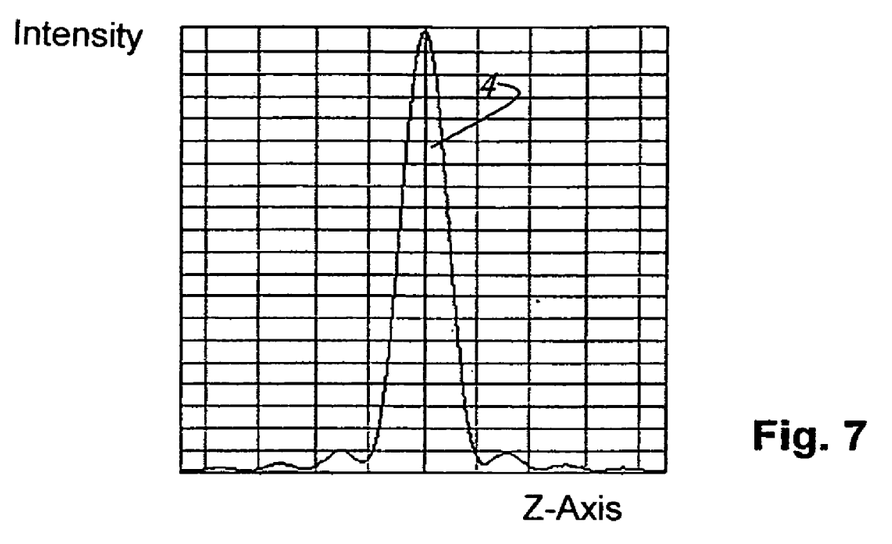
FIG. 7 depicts the PSF after a compensation performed on the PSF of FIG. 2.

This change in the PSF depicted in FIG. 6 is remedied by the correction according to the invention. Peak 4 of the corrected PSF is free of the perturbations and again displays a symmetrical shape. The correction according to the invention is effected such that the optical action of the object embedding can be described by just one single parameter. In general, the object embedding is described by a multitude of parameters. These can be the refractive index of the slide, the refractive index of the cover glass, the refractive index of the medium surrounding the specimen, the refractive index of an immersion fluid used, the temperature, etc. The inventive idea is to combine these diverse parameters into one parameter, which then describes a "virtual embedding" of the object. The effect on imaging, as can be seen from FIG. 7, is a very good approximation to the PSF of FIG. 6.

Figure 8:
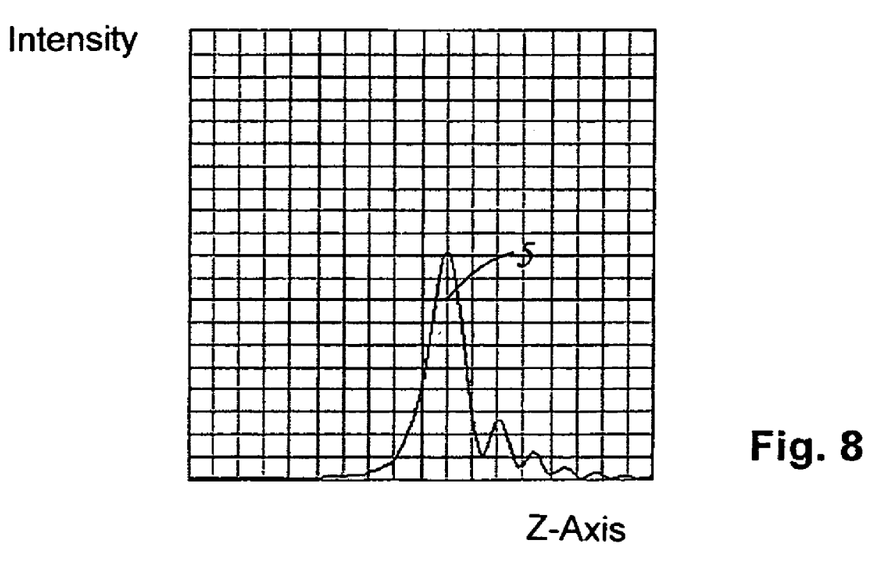
FIG. 8 depicts a PSF affected more strongly than in FIG. 2 by a small deviation of the refractive index of the medium surrounding the object.
Figure 9:
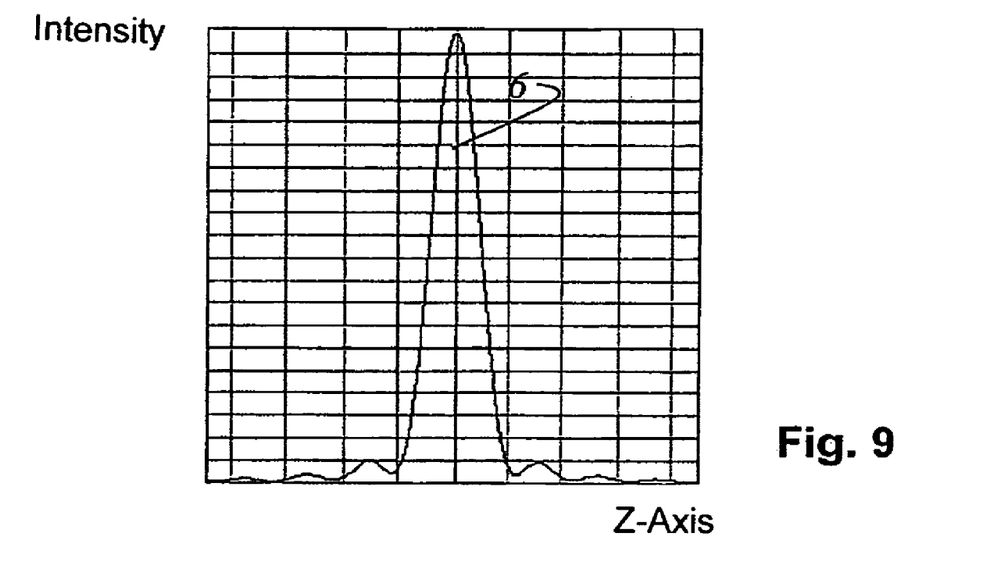
FIG. 9 depicts the PSF after a compensation performed on the PSF of FIG. 4.

FIG. 8 shows a clearer effect of a small deviation in refractive index on the PSF. Peak 5 displays a more distinct asymmetry. This asymmetry is removed in a simple and rapid way with the method according to the invention (FIG. 9). The correction with one parameter restores the symmetrical structure to peak 6 of the PSF and also equalizes the intensity.

Figure 10:
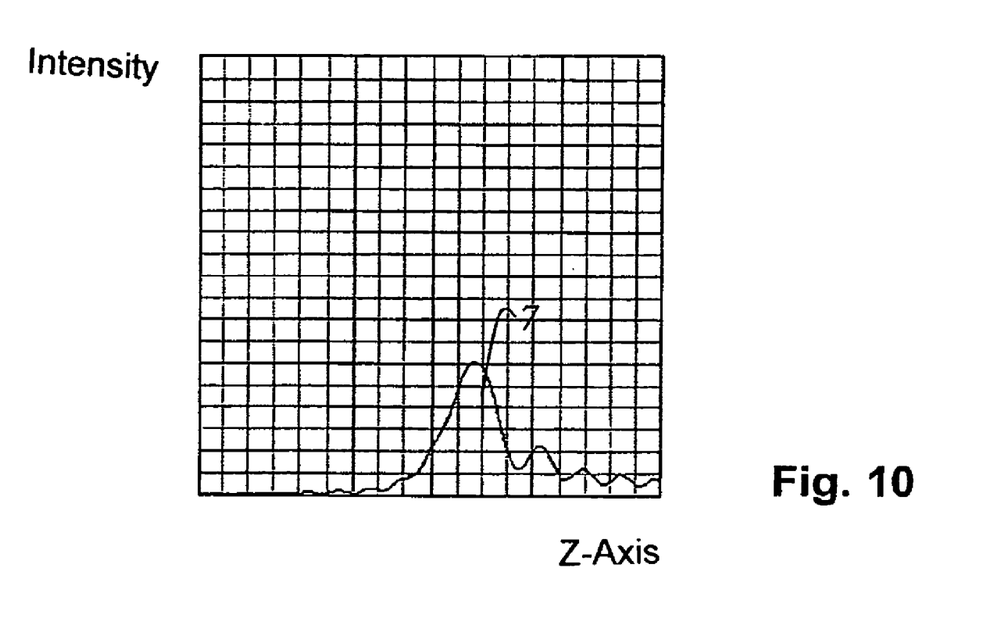
FIG. 10 depicts a PSF strongly perturbed by a large deviation of the refractive index in a thin layer in the environment of the object.
Figure 11:
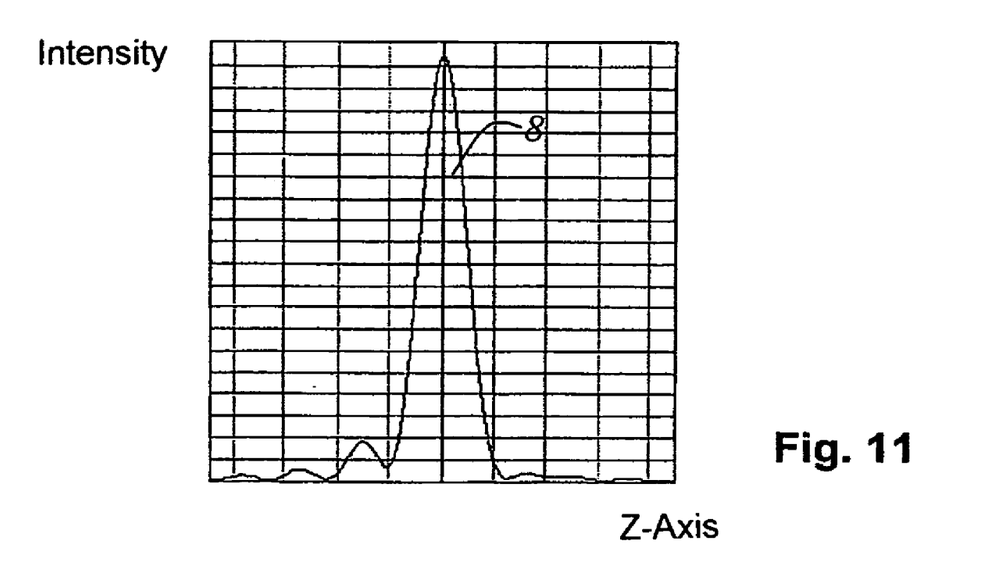
FIG. 11 depicts the PSF after a compensation performed on the PSF of FIG. 4.

The case of a large deviation of the refractive index in a thin layer in the environment of the object is depicted in FIG. 10. Peak 7 suffers severe perturbation and a distinct asymmetry. As depicted in FIG. 11, this perturbation can also be eliminated by the method according to the invention. Peak 8 becomes approximately symmetrical in structure.

On the strength of the depicted result of the method according to the invention, in which the PSF is computationally reconstructed by variation of just one parameter, microscope objectives are provided with a correction mount. In this way, variations in glass thickness, temperature, and also refractive index of the medium can be simultaneously corrected or respectively compensated within certain limits. With this simple apparatus, which changes only one optical component in the ray path. The so-called virtual embedding can be corrected in mechanical fashion. In optical terminology, what is going on is correction of the aperture error or spherical error, in which the phase front in the pupil of an objective is perturbed ("aberrated") by a rotationally symmetric function of order four and higher.

In microscopy with high apertures (or respectively with large aperture angles), correction of a PSF requires taking account of aberration terms of order higher than four, in contrast to the approximations used in the general optics literature. Various values of this deviation now lead in each case to a quite well-defined, unambiguous behavior of the phase error in the pupil. In other words, this also means that only quite well-defined combinations of terms of order four and higher (for an objective of known aperture) are now relevant for this problem.

FIGS. 5 to 11 show that the relationship cited, which yields just one free parameter, does not at all lead to trivial PSFs. These figures are results from a simulation calculation: They show optical mismatch in three distinct situations (see on this point FIG. 6, FIG. 8 and FIG. 10). The PSFs resulting from the mismatches lead to near-ideality after reconstruction of the PSF by variation of one parameter.

Figure 12:
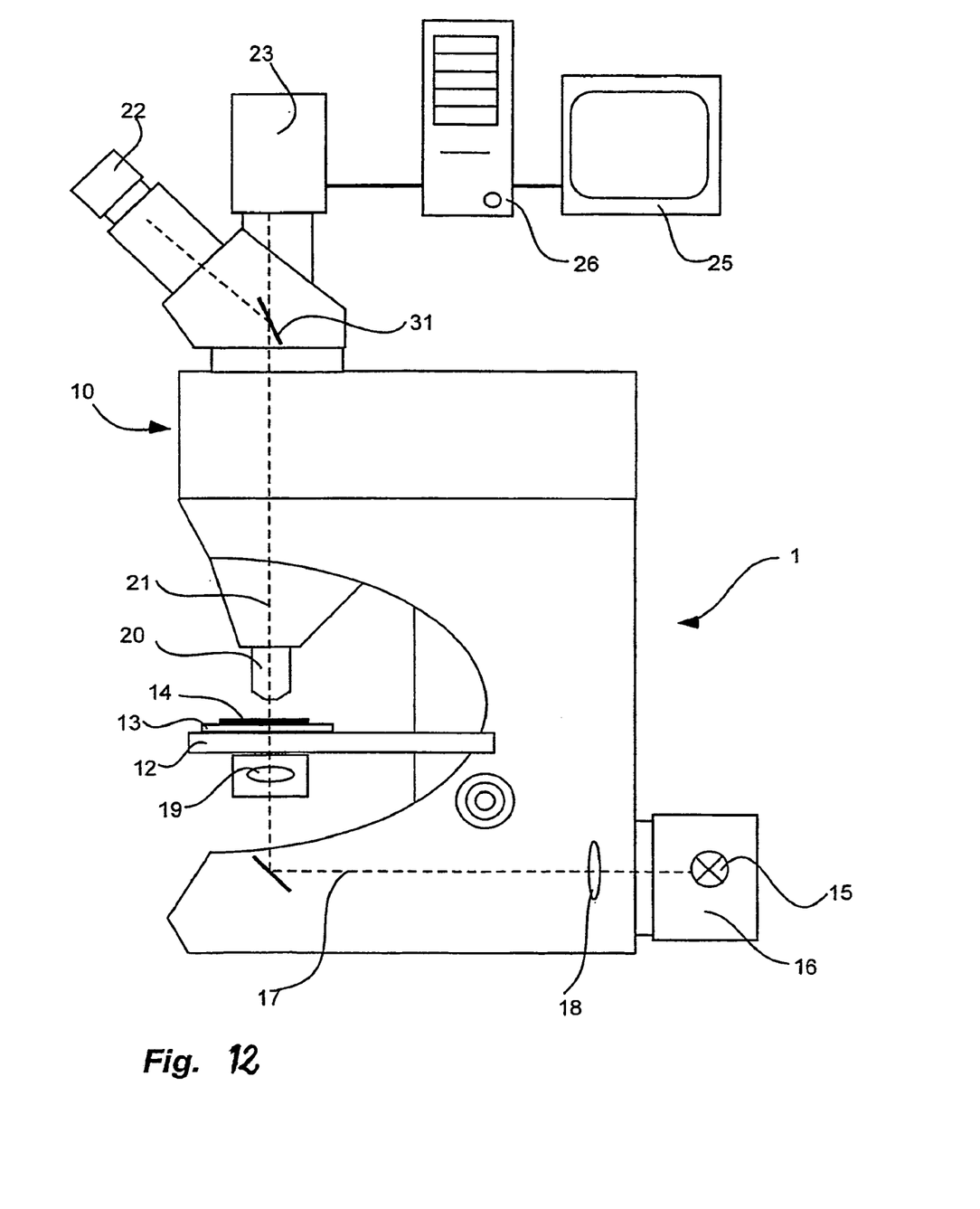
FIG. 12 depicts schematically a microscope system for the performance of the method.

FIG. 12 depicts schematically a microscope system 1 for the performance of the method. Microscope system 1 is made up of a microscope 10 with 12. Microscope stage 12 serves to hold slide 13, on which a specimen 14 to be examined or respectively investigated is mounted. Slide 13 can be for example a glass slide or a Petri dish.

Microscope 10 depicted is a transmitted-light microscope in which an illuminator is arranged beneath microscope stage 12 and specimen 14. The illuminating system is made up of a light source 15 in a lamp housing 16 from which an illuminating ray path with an optical axis 17 issues. The illuminating ray path is aimed, with illuminating optics 18 and a condenser 19, from below onto slide 13 with specimen 14 arranged on microscope stage 12.

The light passing through specimen 14 reaches an objective 20 of microscope 10 arranged above microscope stage 12 and specimen 14. Objective 20 defines an optical axis 21, which aligns with optical axis 17 of the illuminating system. Microscope 10 can be made up of a plurality of objectives 20 as well as an objective changing apparatus, which are not depicted here for the sake of simplicity. Because in the embodiment shown here a fixed microscope stage 12 is employed, the illuminating light is focused onto specimen 14 by adjusting the height of objective 20. Inside microscope 10, the light is conveyed via lenses and mirrors, not depicted, to at least one ocular 22 of microscope 10, through which a user can view specimen 14 arranged on microscope stage 12.

Microscope 10 is further provided with a camera 23, which acquires an image of specimen 14. The light of the illumination as adjusted in each case, that is, for any kind of illumination in the embodiment shown here, passes via an optical element 31 to the at least one ocular 22.

The image acquired by camera 23 is displayed on a monitor 25, which is connected to a computer 26. The system of computer 26, camera 23 and monitor 25 can be employed in order to control motorized microscope functions such as for example a filter positioning apparatus or an autofocus apparatus (not depicted) for microscope 10. Further, the computer serves to perform the method according to the invention on the basis of acquired image data, bringing about a corresponding parametric deconvolution of the acquired image data.

Figure 13:
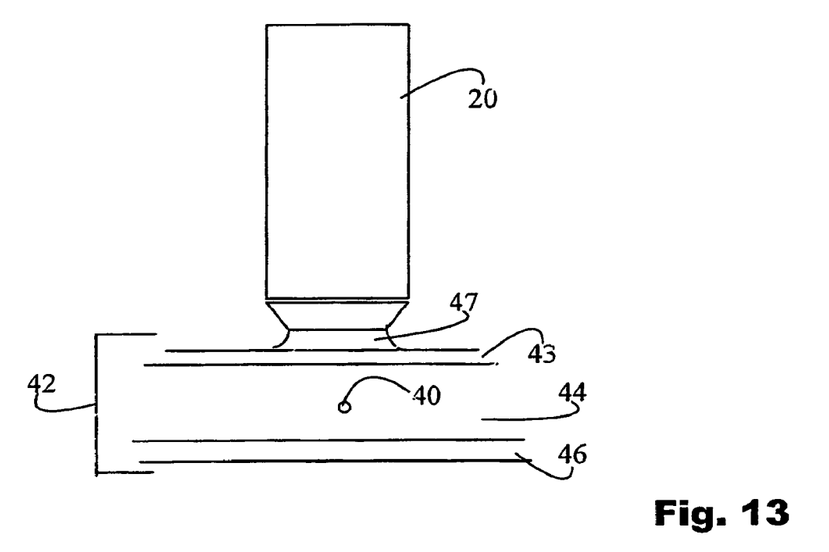
FIG. 13 depicts schematically a microscope objective and the environment surrounding the object, showing above all the typical construction of the planar optical layers having distinct refractive indices between specimen and objective.

FIG. 13 depicts schematically a microscope objective and the environment surrounding object 40, showing above all the typical structure of the planar optical layers varying in refractive index between specimen 42 and objective 20. Specimen 42 itself, in this embodiment, is made up of slide 13 with a certain bottom thickness 46, a nutrient solution 44 and a cover glass 43. The thicknesses of the layers of bottom 46 and cover glass 43 are not drawn to scale; typical thicknesses are 200 µm. A typical object size is roughly 10 µm. When a physiological solution is employed in microscopy, it is generally situated in a Petri dish. The bottom of the Petri dish represents base thickness 46 of slide 13. The optically effective layer in the physiological medium is not the total effective thickness of bottom 46 and cover glass 43 but only the distance between object 40 and cover glass 43. The thickness of this layer thus depends on the exact position of object 40 in the specimen; it can be regarded as constant within object 40. Between objective 20 and cover glass 43 there is an immersion medium 47 having a refractive index $n_2$. Similarly, a refractive index $n_3$ is ascribed to cover glass 43, a refractive index $n_4$ to the nutrient solution or physiological medium, and likewise a refractive index $n_5$ to slide 13. Similarly, a refractive index $n_3$ is ascribed to cover glass 43, a refractive index $n_4$ to the nutrient solution or physiological medium, and likewise a refractive index $n_5$ to slide 13.

These characterizing parameters of the various layers are called experimental parameters because they depend on the particular experiment. In contrast, the features of objective 20 and of the additional optical elements in the ray path of the microscope represent fixed design parameters. These are well known to the user and can for example be stored as fixed parameters in computer 28 of microscope system 1. The model shown in FIG. 9 thus has six parameters (on the assumption of symmetry about the optical axis). In order to calculate the exact PSF of objective 20 due to given layers in this special situation, however, all the layers must enter the computation with high accuracy. This, however, is not the goal. According to the invention, the point is to describe the possible deviations from the ideal PSF determined by the design parameters. To a very good approximation it is sufficient to vary one parameter computationally. The maximum aperture angle of the imaging ray cone is needed as supplemental information. In the ideal case this angle is likewise a design parameter with sin(aperture angle)=NA/$n_2$, where NA is the numerical aperture of objective 20 and the nominal refractive index $n_2$ of the immersion medium is also a design parameter. In the case $n_4<n_2$, which occurs frequently in practice, the maximum aperture angle is reduced by $n_2/n_4$. In contrast to the above-cited ray calculation, however, this value has a weak effect, so that the nominal values for the layers employed (oil, glass, water, etc.) can be taken here.

Figure 14:
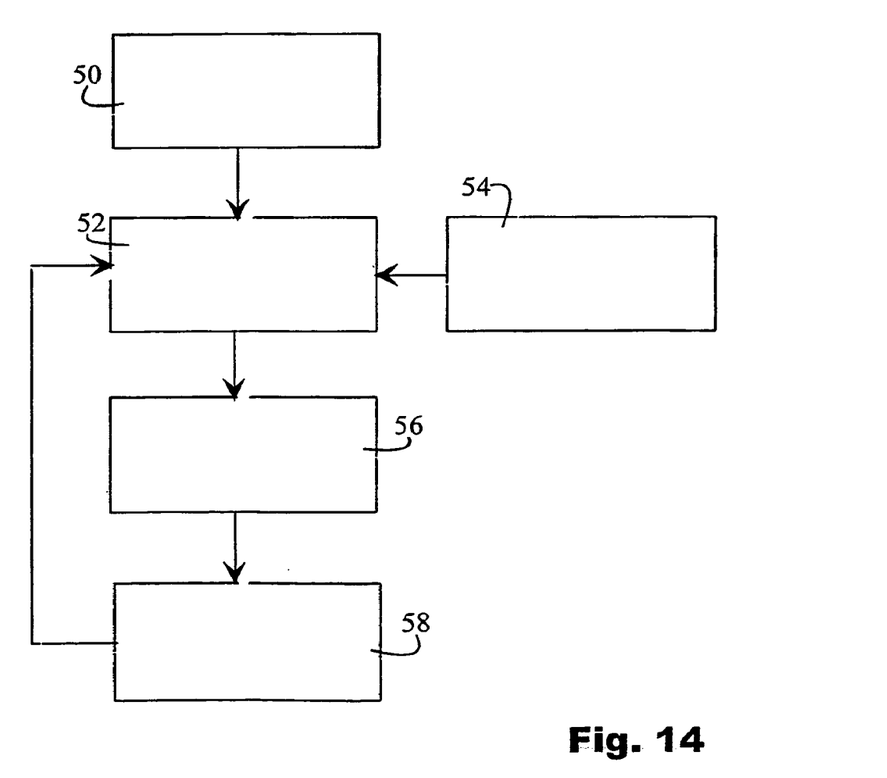
FIG. 14 shows a block diagram of the method according to the invention.

FIG. 14 shows a block diagram of the method according to the invention. The underlying mode of operation of a blind deconvolution algorithm should be understood such that all PSFs and objects possible in the context of the a priori information are varied until best agreement is found between the section images calculated in this way and the measured image stack. It is clear that the computing time required for this purpose and also the strength of any artifacts present will increase rapidly with the number and variation range of the parameters.

According to the invention, an image of object 40 is acquired in a first step 50. It is not categorically necessary to have an acquired image of the object in first step 50. The user can also make an assumption based on what is expected. In a second step 52, an expected image of the object is calculated using an estimate 54 of the PSF in a one-dimensional space. Next, in a fourth step 56, the calculated image and the object are compared with the acquired image of the object. Here the various algorithms permitting termination or respectively continuation of the iterations come into play. If agreement as evaluated according to certain criteria is defective, then in a fourth step 58 a new estimate of the object and a one-parameter PSF are determined. This new estimate of the object and the one-parameter PSF then in turn figure in the calculation of the expected image (step 2). If the comparison is judged positively at a certain time or after a certain number of iterations, the calculated image can be displayed on monitor 25. Implementations of the algorithm differ in how the noise in the observed image is evaluated and the new estimate is formed.

The application of general mathematical and physical constraints to the object function or respectively the criterion for termination is governed by the PSF of objective 20 used (design parameter, known). The one-parameter description and variation (optimization) of PSFs possible within the configuration. Permits rapid and reliable deconvolution.

Thus, if the PSF must be assumed inexactly known in the deconvolution because some quantities are not known, it is not meaningful to permit arbitrary or respectively only generally restricted (positive and band-limited) PSFs if, given good quality of the objective, the optically possible PSFs are restricted to a small, one-dimensional subspace. As a consequence of this way of proceeding, both the computing time and artifacts are expected to be markedly reduced.

In particular, the subspace mentioned is just identical with the subspace of PSFs corresponding to a rotation of a correction mount that can be attached to objective 20. The correction range of a given objective can thus be (so to speak) extended by image processing in the computer, and it is even possible to "add" this property after the fact to an objective with no correction function. Conversely, of course, given proper adjustment of the mechanical correction mount by the user with visual inspection so as to get the best image impression or contrast on monitor 25, it is possible to restrict the search space.

The result of one-parameter deconvolution is displayed on monitor 25 by computer 26 in order to image three-dimensional microscopic objects embedded in a physiological medium.

The invention has been described with reference to a particular embodiment. It goes without saying, however, that changes and modifications can be performed without going beyond the scope of protection of the claims that follow.

The invention claimed is:

1. A method for blind deconvolution of microscopic images characterized by the following steps:
   a) acquiring or respectively generating object data of at least one microscopic object to obtain acquired or respectively generated image data;

b) caculating an expected image using an estimated PSF that depends on a single parameter, and obtaining the calculated image data;

c) comparing the acquired or respectively generated image data with the calculated image data calculated with the estimated PSF, d) determining a new PSF if the result of the comparison is poor, which the new PSF is likewise varied in only one experimental parameter, and e) performing steps b to d until adequate agreement is obtained between the calculated image data and the acquired or respectively generated image data.

2. The method of claim 1 wherein the single parameter takes account of the optical properties of the environment of the object between an objective of a microscope and the region above the object.

3. The method of claim 1 wherein the environment surrounding the object is made up of a layer system of a plurality of layers that are arranged perpendicularly to the optical axis of the objective.

4. The method of claim 3 wherein the layers are characterized by a thickness of the slide, a size or thickness of the object, a thickness of the cover glass, a e layer thickness of the immersion medium, and a distance between object and cover glass.

5. The method of claim 3 wherein each of the layers comprises as individual parameters the thickness of the layer and the refractive index.

6. The method of one of claims 1 to 5 wherein the single variable parameter is a fimetional representation of the individual parameters of the layers in a layer system.

7. The method of claim 6 wherein each of the layers in the layer system is sufficiently well approximated by a suitable value of a correction value Cr and the entire layer system is characterized by the correction value Cr that is equal to the sum of individual Cr values.

8. The method of claim 7 wherein $Cr=d\times\Delta.n$ or $Cr=\Delta d\times\Delta.n$, where d is the thickness of a layer and n is the refractive index of the layer in each case.

9. The method of claim 6 wherein variations in the thickness of the slide, variations in a temperature and the refractive index of the immersion medium or in the temperature and the refractive index of a physiological solution, and the thickness of the cover glass are compensated with the parameter.

10. Software on a data storage medium that causes a computer to perform a method for blind deconvolution of microscopic images characterized by the following steps:

a) acquiring or respectively generating object data of at least one microscopic object to obtain acquired or respectively generated image data;

b) calculating an expected image using an estimated PSF that depends on a single parameter, and obtaining the calculated image data;

c) comparing the acquired or respectively generated image data with the calculated image data calculated with the estimated PSF, d) determining a new PSF if the result of the comparison is poor, which the new PSF is likewise varied in only one experimental parameter, and e) performing steps b to d until adequate agreement is obtained between the calculated image data and the acquired or respectively generated image data.

11. The software of claim 10 wherein the single parameter takes account of the optical properties of the environment of the object between an objective of a microscope and the region above the object.

12. The software of claim 11 wherein variations of the layers of a layer system that depend on the thickness of the slide, the temperature and the refractive index of the immersion medium or the temperature and the refractive index of a physiological solution, and the thickness of the cover glass are compensated with the parameter.

* * * * *